United States Patent Office 3,502,742
Patented Mar. 24, 1970

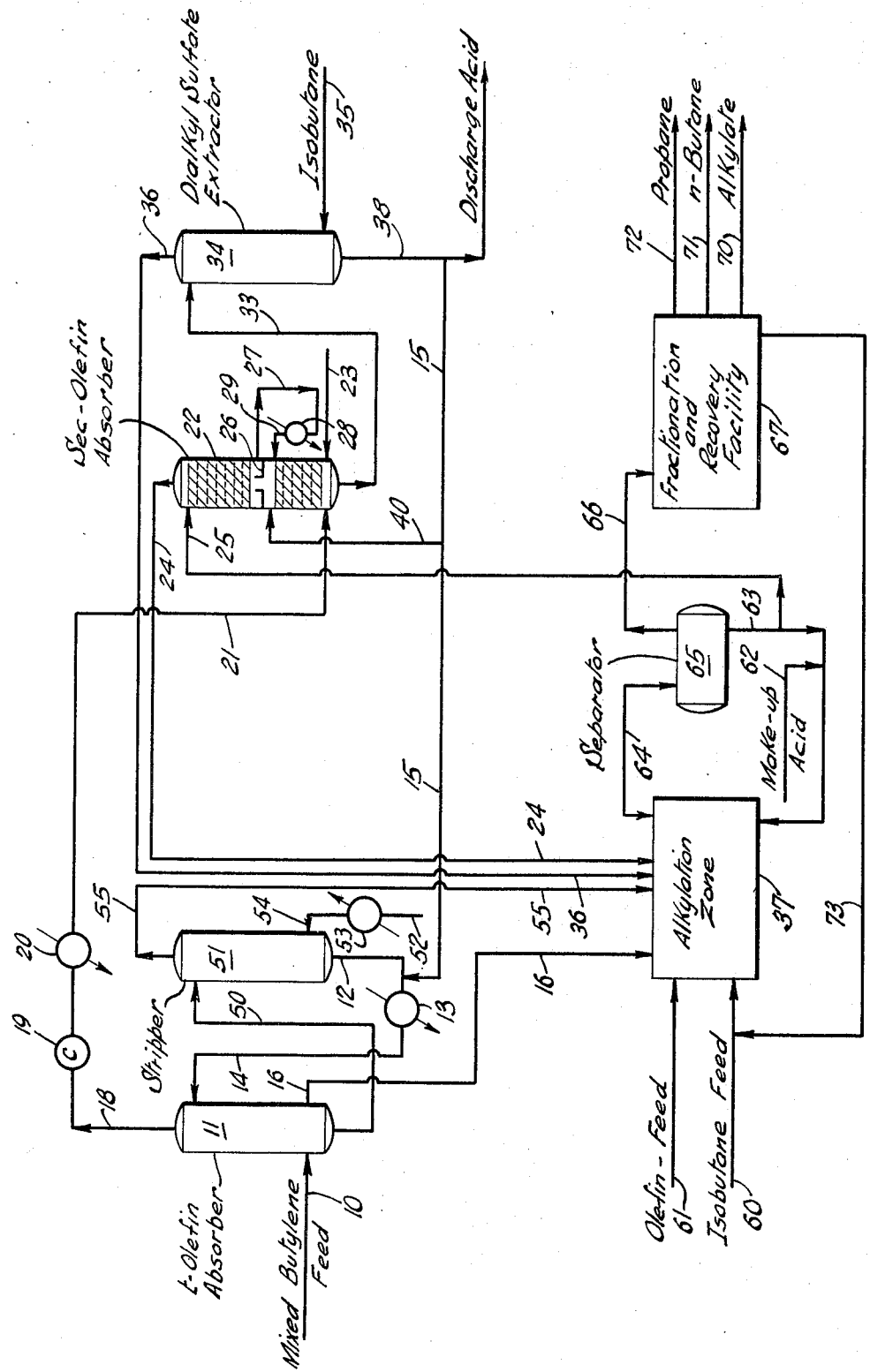

3,502,742
SELECTIVE ABSORPTION OF TERTIARY AND SECONDARY OLEFINS IN ALKYLATION
Arthur R. Goldsby, Chappaque, N.Y.
(135 E. 42nd St., New York, N.Y. 10017)
Continuation-in-part of application Ser. No. 516,448, Dec. 27, 1965, which is a continuation-in-part of application Ser. No. 386,486, July 28, 1964. This application Dec. 26, 1967, Ser. No. 693,333
Int. Cl. C07c 3/54
U.S. Cl. 260—683.61      11 Claims

ABSTRACT OF THE DISCLOSURE

A process for making tertiary olefin feed stocks suitable for use in connection with sulfuric acid recovery in an alkylation process. Tertiary olefin is removed from olefin feed by absorption in 50–70% of $H_2SO_4$, the absorbed tertiary olefin is recovered from the acid by stripping with isobutane, and the isobutane-tertiary olefin mixture is passed to sulfuric acid isobutane-olefin alkylation. Secondary olefin effluent from the 50–70% $H_2SO_4$ absorption is absorbed in used sulfuric acid alkylation catalyst. Absorbed secondary olefins extracted as alkyl sulfates with isobutane are passed to alkylation.

CROSS-REFERENCE TO RELATED APPLICATIONS

This application is a continuation-in-part of copending application Ser. No. 516,448, filed Dec. 27, 1965 and now abandoned, which was a continuation-in-part of then copending application Ser. No. 386,486, filed July 28, 1964, which was issued as U.S. Patent 3,234,301 on Feb. 8, 1966, which in turn is a continuation-in-part of then copending application Ser. No. 50,161, filed Aug. 17, 1960 and now abandoned.

BACKGROUND OF THE INVENTION

Field of the invention

This invention is directed to improvements in the utilization of sulfuric acid used in the alkylation of olefins or aromatics in the presence of sulfuric acid catalyst. More particularly, it is directed to a method of restoring the catalytic effectiveness of sulfuric acid catalyst by the absorption of olefins therein, separating the alkyl sulfates thus formed from the alkylation contaminants, and alkylating the alkyl sulfates with release of 100 percent $H_2SO_4$. In accordance with this invention, olefin feed stocks containing a tertiary olefin, such as isobutylene in admixture with other olefins, are employed by treatment of such stocks with dilute or relatively weak sulfuric acid prior to contact with strong sulfuric acid.

When strong sulfuric acid such as fresh make-up alkylation acid or used alkylation acid catalyst having a titratable acidity of about 85–90% and containing only about 2–4 percent of water is used for the absorption of certain olefins, such as isobutylene containing stocks under conditions used for propylene and n-butylene absorption, a substantial portion of the tertiary olefin undergoes adverse irreversible side reactions which result in loss of iso-olefin and also acid. This has meant that as a practical matter propylene substantially free of butylenes or butylenes free of isobutylene have been required for best results in the acid recovery process.

SUMMARY OF THE INVENTION

My invention involves a combination of cooperative steps by which tertiary olefin containing stocks may be handled with excellent results. The tertiary olefin is recovered by an improved process which comprises the absorption of tertiary olefin from an olefin feed in weak sulfuric acid of less than alkylation strength, extraction or stripping of the absorbed tertiary olefin with isobutane, absorption of the unabsorbed secondary olefins in used alkylation acid, extraction of dialkyl sulfate therefrom with isobutane, resulting in the elimination of alkylation contaminants, and alkylation of the recovered iso-olefin and dialkyl sulfates with isobutane. A unique feature is that isobutylene or isoamylene and also the corresponding olefins as the dialkyl sulfates may be extracted or recovered from acid absorption reaction mixtures with isobutane, and then the recovered olefin and alkyl sulfates may be charged to alkylation without separation of the isobutane. Not only is the tertiary olefin recovered and alkylated, but by its removal from the secondary olefins, it enables the secondary olefins to be used as the charge stock to the acid recovery absorber.

An advantage of my invention is that it enables isobutylene and tertiary amylene containing feeds to be used for the recovery of used alkylation acid, and thus extends greatly the applicability of the acid recovery process. A further advantage of this process is the achievement of higher conversion of sulfuric acid catalyst to dialkyl sulfates with resultant high recovery of sulfuric acid catalyst upon their alkylation. Propylene stocks free of butylenes and facilities for separating butylenes from propylene are not required with my invention. Other advantages are that a higher yield of alkylate basis olefin and a lower net acid consumption are obtained from the same charge stocks. By my process isobutylene and tertiary amylenes are not only economically removed and recovered from stocks containing them, but they are economically utilized by alkylating them. Any alcohols, polymers and alkyl sulfates formed during the absorption and recovery of the tertiary olefins can be utilized by extracting and charging them to alkylation.

A tertiary olefin is one in which one of the olefinic carbon atoms has no hydrogen atoms on it, and the olefinic carbon atom with no hydrogen atoms on it is attached to three other carbon atoms. The tertiary olefins of most interest in connection with this invention are isobutylene and the tertiary amylenes. Higher tertiary olefins which can be removed or absorbed selectively by weak sulfuric acid are also of interest.

There are one tertiary butylene and two tertiary amylenes, as follows:

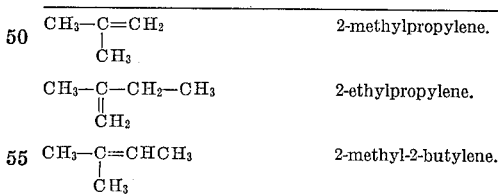

A secondary olefin is one in which at least one of the olefinic carbon atoms has one hydrogen on it, and at least one of the olefinic carbon atoms is attached to two other carbon atoms. There are one secondary propylene, two secondary butylenes (three if cis and trans 2-butylene are considered as separate compounds), and three secondary amylenes, as follows:

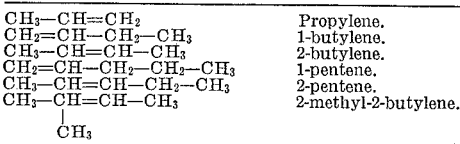

BRIEF DESCRIPTION OF THE DRAWINGS

Having set forth the general nature of the invention, it will be best understood from the more detailed description accompanying the drawing. Although the drawing illustrates an arrangement of apparatus in which the process of this invention may be practiced, it is not intended to limit the invention to the particular apparatus or materials described.

DESCRIPTION OF A PREFERRED EMBODIMENT

Referring to the figure, a mixed butylene feed gas at 15 pounds per square inch gauge containing isobutylene is passed through line 10 to countercurrent tertiary olefin absorber 11 near the bottom. Sulfuric acid having a concentration of 50–70 weight percent on an acid-water basis is charged through line 12, cooled to about 55° F. in cooler 13, and passed through line 14 to the top of tower 11. The bulk of the acid is recycle acid, and only a very small amount of make-up acid is required. Make-up acid may be fresh sulfuric acid, used alkylation catalyst, or preferably spent acid raffinate from the acid recovery system as shown in line 15. Isobutylene absorber tower 11 is operated at a top temperature of about 75° F. and a vapor outlet pressure of about 10 p.s.i.g. so that unabsorbed materials including n-butylene pass out of the tower through line 18. The butylene vapors rise in the tower and the isobutylene reacts with the descending sulfuric acid.

Any polymer formed in absorber 11 separates as a liquid layer in the bottom of absorber 11 and is decanted, withdrawn through line 16, and sent to motor fuel by means not shown, or passed to alkylation zone through line 16. It is preferred to send it to alkylation since it may contain dissolved alkyl sulfates and butyl alcohols. The n-butylenes in line 18 substantially free of isobutylene are passed to compressor 19 and cooler 20 forming a liquid in line 21. Liquid olefin feed in line 21 is fed to the bottom of secondary olefin absorber 22. Additional olefin feed, which may be a propylene stream or other olefin free of tertiary olefin, may be introduced through line 23. Used alkylation acid catalyst of about 90 percent $H_2SO_4$ concentration is passed through line 25 to the top of countercurrent secondary olefin absorber 22. Absorber 22 is operated in the liquid phase at about 60 p.s.i.g. and a temperature of 20–40° F. is maintained by withdrawing a portion of the downflowing liquid from trap tray 26, through line 27, cooler 28 and returning cold liquid to absorber 22 through line 29. Absorber overhead liquid containing some dissolved alkyl sulfates and any unreacted olefin is withdrawn through line 24 and passed to alkylation zone 37. The absorption reaction mixture comprising dialkyl sulfate is passed through line 33 to countercurrent dialkyl sulfate extractor 34 near the top. Isobutane from line 35 is passed to extractor 34 near the bottom. The overhead comprising isobutane and dibutyl sulfates substantially free of alkylation contaminants is passed through line 36 to alkylation reactor 37. The raffinate or spent acid is discharged through line 38 from the bottom of extractor 34. The spent acid comprises alkylation contaminants, such as acid-oil complex and water, and any unextracted alkyl sulfates.

Advantageously, two absorbers and two extractors may be used with the raffinate acid from the first extractor being used as charge acid to the second absorber. In the first absorber the concentration of the make-up acid to the absorber and the amount of olefin absorbed may be controlled so that the organic contaminant which is harmful to the alkylation is not extracted in the extraction step. Alternatively, a portion of the raffinate acid may be recycled to the absorbers as shown through lines 15 and 40.

The acid phase from absorber 11 comprising absorbed isobutylene is passed through line 50 to weak acid stripper 51. Stripper 51 is a packed column employed for liquid-liquid extraction. Isobutane is passed to the bottom of stripper 51 through line 52, heater 53 and line 54. The overhead from stripper 51 comprising isobutane, isobutylene and isobutyl acid sulfate are passed through line 55 to alkylation reactor 37. The lean acid phase is recycled to isobutylene absorber 11 through line 12.

The isobutylene absorbed in absorber 11, the n-butylenes absorbed in absorber 22, and additional isobutane from line 60 and olefin feed from line 61 are alkylated in alkylation reactor 37 with a sulfuric acid catalyst. Fresh sulfuric acid of 98.0–99.5% concentration through line 62 and recycle acid of about 90% concentration in line 63 are also charged to reactor 37. The alkylation reaction mixture is passed through line 64 to separator 65. Acid and hydrocarbon phases are separated in separator 65, the acid phase being recycled to alkylation zone 37 through line 63 and the hydrocarbon effluent being withdrawn through line 66 to conventional fractionation and recovery facility 67. In facility 67, alkylate product is separated and discharged through line 70 for motor fuel or other use. n-Butane and propane are withdrawn through lines 71 and 72, respectively, and isobutane is withdrawn through line 73 for recycle to line 60 and alkylation zone 37.

In general, the same conditions are required for tertiary amylene and tertiary hexylene containing stocks as for isobutylene containing stocks. Hence, for simplicity, conditions required for isobutylene stocks will be discussed in more detail under several headings, which follow:

Tertiary olefin absorption

Any feed stock containing a tertiary olefin may be used for the reaction with or absorption in weak sulfuric acid; such as $C_4$ fractions and $C_3$–$C_4$ fractions, and $C_5$ fractions from catalytic cracking, absorber tail gas from catalytic cracking and polymerization effluent gas.

For the removal of isobutylene from an olefinic feed, acid of about 40 to 70 percent concentration may be used, and a concentration of about 60–65 percent is preferred. A feature of this step of the process is the extraction of substantially all of the isobutylene, as isobutylene remaining in the n-butylenes will otherwise destroy an excessive amount of alkylation acid catalyst in the formation of dialkyl sulfates. Thus, conditions are selected to favor complete removal of isobutylene rather than to obtain a high degree of selectivity. Conditions favoring complete isobutylene removal include the use of acid of about 65 percent concentration, efficient countercurrent or multistage contacting, and with an excess of the weak acid. Any alcohols and polymer formed are utilized substantially without any separate processing cost, since they may be recovered in the feed stocks passed to alkylation. Used alkylation acid catalyst containing about 3 percent water and titrating 85 percent or higher $H_2SO_4$ is much to strong for good results. It must be weak enough not to absorb any substantial amount of n-butylenes or propylene. Used alkylation acid catalyst may be used as make-up acid as it becomes diluted with reaction mixture containing considerable water. The dissolved isobutylene is more easily stripped or extracted from weaker acid, but since in my process the extraction step is relatively low in cost, it is more important to remove substantially all of the isobutylene from the n-butylenes than it is to make the isobutylene easy to extract from the absorption mixture. Isobutyl acid sulfate formation is favored by a higher acidity. A lower acidity favors tertiary butyl alcohol formation.

The temperature of the isobutylene absorption is not critical, and the operable range of temperature will depend upon a number of factors, including the acid concentration. Lower concentration acids allow higher temperatures to be used, and higher concentration acids require lower temperatures to be used for god results. A temperature of about 75° F. with acid of about 65 percent concentration is satisfactory, and a temperature below about 100° F. is usually used, preferably in a range of 50 to 100° F. The temperature of the absorption is advantageously near or not much below the extraction or stripping temperature, since lean acid is recycled from the extraction step to the absorption step.

I prefer to carry out the absorption in the vapor phase, allowing the unreacted n-butylenes to pass out of the extraction vessel in the vapor phase. However, liquid phase absorption is satisfactory, and under some conditions more complete removal of the isobutylene may be obtained in the liquid phase. Under the conditions described, very little polymer is formed. When liquid phase conditions are used, isobutylene and any polymer or isobutyl acid sulfate dissolved in the liquid n-butylene phase are advantageously removed before charging them to the used alkylation acid absorber. When operating in the liquid phase, the absorption is carried out under conditions of low temperature and low hydrocarbon dilution so that isobutylene is not extracted from the acid phase. With acid of about 62 percent $H_2SO_4$ concentration, a reaction mixture may be formed with about 33 percent of isobutylene in it.

Since a substantial amount of heat is released upon absorption of olefins in acid, it is necessary to cool the absorption step to maintain the temperature within the desired range. Cooling of this and subsequent absorption steps is effected by cooling the feed streams to the absorption tower and/or by cooling material within the absorption step either by evaporative cooling or by indirect heat exchange methods. Liquid may be withdrawn from the absorption system, cooled by indirect heat exchange, and returned to the absorber. Coolant may be supplied by a separate refrigeration system or may be effected with a process stream. In one embodiment of this process, hydrocarbon effluent from the alkylation reaction zone is flashed effecting vaporization of a part of the hydrocarbon liquid and cooling of the resulting liquid and vapor. The resulting chilled hydrocarbon liquid and vapor are passed in direct heat exchange with a stream in the absorption reaction mixture to effect cooling thereof.

In summary, the important thing in the absorption of the tertiary olefin is to choose a concentration of sulfuric and reaction conditions such that the tertiary olefin is selectively and almost completely removed, leaving the secondary olefins unabsorbed.

Tertiary olefin stripping

Although various hydrocarbon solvents and inert purge gases may be used to strip or extract the absorbed isobutylene from the weak sulfuric acid, I have found that the preferred solvent is isobutane. Other solvents, such as propane, n-butane, or normally liquid hydrocarbons, either entail expensive processing steps for removal from the isobutylene, or are harmful if charged to alkylation along with the isobutylene. Isobutane, is ideal in a number of respects. It has a low molecular weight, is readily available in large quantities in the process as described, gives good results, and it need not be separated from the isobutylene charged to alkylation. In fact it is advantageous to have it admixed with isobutylene when the isobutylene is charged to alkylation. It also is advantageous to use a high isobutane to isobutylene ratio for the stripping. In liquid phase experiments ten mols of isobutane per mol of absorbed isobutylene give much better results than two mols, in that a higher percentage of the isobutylene is extracted and with the formation of less polymer. The results with twenty mols of isobutane are not substantially better than with ten mols, mainly because the results are very good with ten mols. With ten mols the recovery of isobutylene is about 90 percent or higher with formation of less than 5 percent of polymer. A high solvent dosage allows a lower extraction temperature to be used which in turn results in less polymer formation. And, as pointed out earlier, it is desirable to have the extraction or stripping temperature not much higher than the absorption temperature. With lower temperatures and higher solvent dosages when operating in the liquid phase, some sulfate of isobutylene is extracted in addition to free isobutylene. This is highly desirable since such isobutyl sulfate when alkylated releases 100% $H_2SO_4$. Under certain conditions, for example when using make-up acid from alkylation or from extractor 34 or stripper 45, this results in a lower overall net acid consumption. Although liquid-liquid extraction of the isobutylene has been described for stripping isobutylene from the weak acid absorption mixture, the isobutylene may also be stripped with isobutane in vapor phase. Isobutane is available from the deisobutanizer in the vapor phase at a sufficiently high temperature for the stripping step without additional heating, although the temperature of the extraction step may be raised further if necessary.

Isobutylene becomes easier to extract or strip as the temperature of the stripping operation is raised. However, more polymer forms as the temperature is raised, and it of course adds to the cost to heat and then cool the recycle acid if there is a large temperature differential between the absorption and stripping steps. Thus, when a temperature of about 100° F. is used for absorption, I prefer to use a temperature about 125° F. for the isobutane stripping step. In general about a 25° F. higher temperature in the stripping step is preferred, although a greater differential in temperature can be used. A temperature range of about 100—200° F., or even somewhat higher, can be used for the stripping stem. As mentioned earlier, the strength of the absorption acid also has a bearing on the description or stripping temperature used.

If the extraction or stripping of isobutylene is carried out at a higher temperature than the absorption is isobutylene, as is usually the case, the recycle stream of lean acid or the absorption zone must be cooled. This can be done effectively in a number of ways, for example, by flashing lean acid and a portion of the stripping isobutane, or by adding another stream of isobutane and flashing. When the acid is flashed to a lower pressure than the absorption pressure, the cooled acid is pumped back into the absorber. Advantageously, the isobutylene containing feed is injected into the pump. After reacting in the pump, the reaction mixture is passed to a separator.

Since the function of the weak acid absorber is to remove isobutylene from the normal butylene, it is not necessary to alkylate the recovered isobutylene. It may be used for other purposes, such as in chemical manufacture, for example, in the manufacture of alcohols, butyl and specialty rubbers, detergent intermediates, and lubricating oil viscosity index improvers. If a high concentration of isobutylene is desired, the isobutylene may be separated from the isobutane stripping medium. Since the acid life in the isobutylene absorber is long, it tends to become diluted by water picked up from the hydrocarbon charge stocks. Make-up acid of higher strength is therefore added to the isobutylene absorber to maintain the desired 50 to 70 percent concentration of $H_2SO_4$. Thus fresh acid of the strength added to alkylation, or spent alkylation acid catalyst from line 25, or raffinate acid from lines 38 and 15 can be added. A particularly desirable source of the make-up acid is the spent acid raffinate comprising alkyl acid sulfate and acid-oil complex from extractor 34, optionally after removal of at least part of the polymeric oil by means not shown. The oil may be removed by adding water so that any polymeric oil separates, by absorption with an effective agent such as vegetable charcoal, calcium carbonate, and equilibrium silica-alumina fluid catalytic cracking catalyst, or by salting out with inorganic salts. Preferably only that amount of water need to cause separation of polymeric oil is employed, and the exact amount needed depends on the composition of the spent acid. In cases where the acid used in weak acid absorbed 11 causes separation of polymeric oil which would normally be tied up with acid in line 15 as a complex, separated polymeric oil is removed from the system or from the polymer in line 16 prior to charging it to alkylation. Also, in some cases it may be necessary to remove a small amount of acid from line 53 for the purpose of maintaining the polymeric oil at a desirable low percentage.

Although the stripping or extraction can be carried out in either vapor or liquid phase, liquid phase is preferred and almost essential for olefins of higher molecular weight than $C_5$.

Secondary olefin absorber

The feed to the secondary olefin absorber is the effluent from the tertiary olefin absorber, comprising secondary olefins alone or with propylene and any additional $C_3$, $C_4$, $C_5$ or higher hydrocarbons. The secondary olefin absorber feed may be supplemented with other olefin streams which are substantially free of tertiary olefin.

The secondary olefin absorption may be carried out in either vapor or liquid phase, or in a combination of the two. For example, part of the absorption may be carried out in the vapor phase, followed by liquid phase for the final portion of the absorption step for a high conversion of the acid to dialkyl sulfates. Cooling in the absorption step may be effected, if desired, by introducing all or a part of the charge; or extraneous hydrocarbons, such as propane, in liquid phase and allowing it to vaporize by the heat of reaction in the absorber. Cooling may also be effected by using charge streams to the absorber cooled to a temperature below the absorber reaction temperature, for example, the used acid catalyst may be supplied from an emulsion flashing alkylation operation. Cooling may also be obtained by indirect heat exchange with cooling coils either in the absorber or outside.

Used alkylation acid catalyst having a titratable acidity of 88 to 93% by weight and containing only about 2 to 4 percent water is the preferred acid charge stock for the absorption step, although in some cases, for example, if amylenes are being alkylated, it may have a concentration as low as 80 to 85%. Acid from other sources, such as fresh acid, acid from chemical reactions, and acid from the acid treatment of petroleum naphtha or lube oil may also be used. Acid with a concentration as low as about 78 percent $H_2SO_4$ and containing up to 22 percent water may be used for the absorption of propylene and n-butylenes.

Stocks such as absorber tail gas or polymerization effluent gas usually contain substantial amounts of ethylene, as well as inerts. It is well known that ethylene is harmful to alkylation in that it causes an increase in the acid consumption. An effective means of handling ethylene containing olefin feed stocks is to run the absorber under conditions such that the ethylene will not react with the acid and, thus, it will be eliminated along with the inerts and not charged to alkylation. Such conditions include, for example, use of vapor phase adsorption, a short residence time, low temperature, low partial pressure of ethylene, acid diluted with alkyl sulfates, and lower concentration acids. The small amount of ethylene reacted to form ethyl acid sulfate or diethylsulfate is eliminated from the system in the raffinate or spent acid from the extractor after strong acid absorption of the n-butylene.

A short residence time and low temperature are conducive to good results in the absorber and preferred although other factors have a considerable bearing on these variables. The efficiency of contacting of olefin with acid is of course very important. Residence times as short as a few seconds or minutes may be used, if a feed stock is passed through an efficient contacting device. On the other hand, a residence time as long as an hour or longer may be used in a liquid phase reactor, or in a packed countercurrent tower by venting inerts in vapor phase and recycling liquid reaction mixture from near the bottom of the tower to about half way up or higher in the tower.

A temperature range of 30 to 50° F. is satisfactory for propylene although less conjunct polymer is formed at lower temperatures. For n-butylene containing stocks, a temperature of 20 to 40° F. is preferred.

The isobutylene and also n-butylene absorption steps may be effected in contacting equipment well known in the art, for example, mixer settlers, centrifugal contactors, countercurrent towers or two or more mechanically stirred reactors operating to give countercurrent flow. When it is desired to obtain a high conversion of the acid to dialkyl sulfates, multistage countercurrent contacting is preferred.

Although not a great deal of inerts remain dissolved in the liquid product from the absorber, if desired, the inerts may be removed, for example, by reducing the pressure on the liquid product and venting the evolved gases.

Only about 10 to 25 percent of the total olefin used in the overall process need be charged to the sulfuric acid catalyst absorber with production of a high yield of dialkyl sulfate to restore the activity of the catalyst. When it is desired to process more olefin feed through the absorber than the available acid will convert to dialkyl sulfate, for example in the separation of olefin from inerts, this may be done and the entire acid phase from this absorber charged directly to alkylation. In this case, enough olefin feed is charged to another sulfuric acid catalyst absorber for conversion of the olefins to dialkyl sulfate followed by separation of the alkylation contaminants before charging the dialkyl sulfates to alkylation.

Certain economies may be effected and superior results obtained by carrying out the reaction of the olefin with sulfuric acid catalyst and the extraction of the resulting alkyl sulfates with a hydrocarbon simultaneously in the same vessel, such as in a countercurrent tower. Non-catalytic alkylation conditions are maintained so that even though alkylation acid catalyst may be used for reaction with olefin in the presence of isobutane, the acid in contact with isobutane and olefin is below catalytic alkylation strength.

Extraction of secondary olefin absorber reaction product

Low temperatures and short times are preferred for the hydrocarbon extraction of the secondary olefin, such as n-butylene, absorber reaction product. For example, a temperature range of 30 to 50° F. with a few minutes residence time is satisfactory. However, good results have been obtained at ambient temperatures as high as 85 to 100° F. The conditions depend somewhat upon the absorption product and the olefin used for the absorption step.

The extraction step may be effected in equipment known in the art, for example, mixer-settlers, centrifugal contactors or countercurrent towers, for example, a rotating disc contactor. Less efficient extraction may be used to accomplish the same results if more water is present in the absorber reaction product.

The separation of the dialkyl sulfates from the acid-oil reaction product and water may be made in numerous ways, as disclosed in my U.S. Patent 3,227,774 which issued on Jan. 4, 1966. For example, the absorber reaction mixture may be diluted with a large quantity of water, extracted with a hydrocarbon, such as isobutane, or a hydrocarbon solution may be chilled.

Dialkyl sulfates are more readily extracted with a hydrocarbon than the alkyl acid sulfates. Thus, it is desirable to use conditions in the extraction step so as to extract not only the dialkyl sulfate, but also the alkyl acid sulfate and to approach as nearly as possible only aicid-oil reaction product and water in the raffinate spent acid phase, with all of the alkyl sulfates in the extract or organic phase. Such conditions include the use of a liquid solvent dosage of the order of six mols per mol of alkyl sulfate, or higher, raffinate recycle, multi-stage countercurrent extraction, and optimum charge rate for a given extraction vessel. The raffinate or spent acid from the extraction step comprises water, alkyl acid sulfate, dialkyl sulfate and the reaction product of acid and polymeric oil formed during the alkylation and adsorption steps.

The extract comprises the hydrocarbon solvent, dialkyl sulfate, and a minor amount of alkyl acid sulfate.

Raffinate or spent acid from a n-olefin absorber usually contains only a small amount of water and a lot of organic matter or hydrocarbon. For example, as indicated later, a raffinate from propylene absorption and subsequent extraction with isobutane comprised 2.5% water, 11.2% acid polymeric oil, 11.4% diisopropyl sulfate and 74.9% propyl acid sulfate. This is equivalent to about 34% hydrocarbon. Such an acid containing so much hydrocarbon is not as desirable for acid recovery as one with a lower hydrocarbon content, for example about 3–10% by conventional burning processes to give $SO_2$ and subsequently $SO_3$. In other words, the acid is improved for conventional recovery if it has a lower hydrocarbon content. Most of the hydrocarbon in the acid also represents a loss of valuable olefin if the acid is sent to conventional acid recovery.

The weaker the raffinate acid is in the extraction step, the higher the realtive solubility of the polymer oil is in hydrocarbon solvent, or the polymer oil is held less tightly by the acid. Polymeric oil contaminant in the absorber-extractor extract is highly unsaturated and it reacts readily with strong sulfuric acid, such as fresh make-up acid used for the alkylation step, or used alkylation acid catalyst, or about 90% concentration. The polymeric oil then may be removed from the absorber extract by acid treatment prior to charging it to alkylation, and optionally after removal of any excess unreacted olefin. Good results have been obtained by acid treating polymeric oil in isobutane solution with used alkylation acid of about 90% concentration at a temperature of 85° F. and a time as long as one hour. However, a temperature not over about 40 to 60° F. and a short time on the order of a few minutes or less are preferred. A very short time such as is obtained by mixing with a pressure drop orifice appears to be satisfactory. To insure substantially complete removal of the oil and also any water present, an excess of acid may be used. If too great an excess of acid is used, some dialkyl sulfate will not dissolve in it and be lost from the extract. This is not too serious as the dialkyl sulfate may be reextracted with a hydrocarbon solvent from the separated acid phase. Or when operating in a continuous system, the acid phase may be charged to the main extraction tower. Alternatively to acid treating the extract, the entire absorber reaction product prior to extraction of the dialkyl sulfates may be acid treated to remove the polymeric oil.

Alkylation

In general the conditions for the alkylation step are those which are well known in the art. However, the bulk of the make-up acid is charged to alkylation as alkyl sulfates which result from the recovery section, and only a minor portion of the acid is charged as the fresh make-up acid of the usual 98 to 99.5% concentration. Since the alkyl sulfates are substantially water free, the trend is for the system catalyst, when using the acid recovery process, to be of lower water content and, in general, of superior quality in that a lower end point alkylate of higher octane value is obtained. Of course, if desired, less drying of charge stocks may be used, and in such a case the water content of the system catalyst may be as high as in conventional operation without acid recovery. The sulfuric acid in the alkylation system is usually maintained within a range of about 88 to 95% by purging spent acid from the system. In a multiple reactor system, the acid of the lowest concentration is preferably purged and sent to the acid recovery system.

When the equivalent acid, after removal of oil, from the spent acid from extractor 34 is of the order of 80% or higher, and preferably 90% or higher, a portion of it may be advantageously recycled to alkylation reactor 37 together with strong make-up acid of about 99.5 percent concentration. With this processing sequence, a method of oil removal which does not increase the water content of the acidic material, such as absorption or salting out is preferred. The amount of acid which may be recycled to alkylation reactor 37 may be increased by removing at least some of the water as well as oil. This is done, for example, by adding a dessicant, by low temperature distillation, or by adding a dual purpose oil and water removal agent, such as anhydrous sodium chloride or anhydrous sodium sulfate. When both oil and water are removed from the spent acid from extractor 34, the remaining material consists largely of sulfuric acid or its equivalent, alkyl acid sulfate. Preferably enough water is removed so that there is not more than about 3.0 percent by weight basis the sulfuric acid equivalent. If this is done, and oil is also removed to a low level, then fresh make-up acid of about 98 to 99.5 percent concentration need be added to the alkylation reactor only in an amount to make up for losses such as mechanical losses and losses by reduction.

A large excess of isobutane is used in alkylation, for example, as much as 60 to 80 volume percent of the hydrocarbons in the alkylation reaction mixture. Consequently, a large quantity of isobutane must be recovered and recycled for reuse in the alkylation process. It is also available for the recovery process as descirbed, and for the extraction or stripping of isobutylene.

In addition to the olefin which is charged to the alkylation step in the form of alkyl sulfates, additional fresh olefin is usually charged to the alkylation step. For example, when propylene is used for the absorption step, it is advantageous to use butylenes in the alkylation step.

Further reaction of spent acid

It has been found that the spent acid or raffinate from extractor 34 has surprisingly little water in it, which means that the equivalent acid is quite strong. For example, in a pilot unit run in which propylene was reacted with used alkylation acid catalyst, the raffinate from the extractor comprised 2.5% water, 11.2% acid-polymeric oil, 11.4% diisopropyl sulfate and 74.9% propyl acid sulfate. Fresh acid to the alkylation reactor was of 97.5% concentration with 2.5% water. The system alkylation acid or used alkylation acid catalyst charged to the propylene absorber titrated 91.0% $H_2SO_4$ and contained 2.7% water and 7.2% acid-oil complex. Since the diisopropyl sulfate is equivalent to 53% $H_2SO_4$ and the propyl acid sulfate is equivalent to 70% $H_2SO_4$, the raffinate has an equivalent acidity of approximately 96% considering the propyl acid sulfate acid and diisopropyl sulfate as equivalent acid. It appears that the diisopropyl sulfate and propyl acid sulfate content of the raffinate are due to the high equivalent acidity of 96%. The same general result is obtained when butylenes are charged to the absorber. rather than propylene.

It is highly desirable to extract the alkyl sulfates almost completely from the raffinate since unextracted material otherwise represents a loss of olefin or potential alkylate and acid. High recoveries of extracted alkyl sulfates may be obtained by further reaction of the raffinate with an olefin, such as propylene or n-butylene, in the same manner as described for the n-butylene absorber. By such readsorption, remaining propyl acid sulfate is converted to diisopropyl sulfate which is more readily extracted than the propyl acid sulfate. Furthermore, the remaining raffinate after reextraction of dialkyl sulfate has a lower equivalent acidity which favors alkyl sulfate extraction. By this procedure over 90 percent of the equivalent acid and a corresponding amount of olefin in the raffinate can be recovered and sent to alkylation. This recovery of additional alkyl sulfates by reabsorption with raffinate acid can be continued until the equivalent acidity becomes so low that the resulting acidic material, principally alkyl acid sulfate, is not reactive with any more olefin, which concentration is about 70 percent at ambient temperatures for secondary olefins. The reaction may be continued even further by using more reactive olefins or olefin combinations for conversion of the raffinate acid such as butylenes, amylenes and their mixtures. Lower temperatures favor the equilibrium so that a high concentration of dialkyl sulfate may be obtained, which is desirable. If the raffinate with the analysis given is again reacted with propylene under conditions to convert about 90 percent propyl acid sulfate to diisopropyl sulfate, the equivalent acidity considering only the water and propyl acid sulfate is reduced to 67 percent. The remaining 10% of the raffinate with an equivalent acidity of 67 percent after removal of the dialkyl sulfate has an analysis of 11.1% water, 33.3% propyl acid sulfate, a trace of diisopropyl sulfate, and 55.6% acid-oil complex. Ultimately, a raffinate is produced which is essentially water and acid-oil complex with a reduced amount of alkyl acid sulfate. When this is done, the net acid consumption is approximately 0.016 pound per gallon of alkylate of 0.67 pound per barrel of alkylate.

The reactions involving the conversion of sulfuric acid to mono- and dialkyl sulfates are of such a nature that the raffinate from the reaction of used alkylation acid with a secondary olefin is strong enough in equivalent acid, or it contains enough alkyl acid sulfate in relation to dialkyl sulfate so that additional reaction will take place with olefin. Thus, additional recovery of acid and olefin may be obtained by reacting the raffinate with additional olefin, and then extracting the dialkyl sulfate. I prefer to extract the dialkyl sulfate from the second raffinate with a hydrocarbon solvent such as isobutane, but other suitable means may be used for the separation, such as water dilution and salting out. Although the maximum benefit may be obtained by using a separate absorber for treatment of the raffinate from the extraction step, the objective of recovering additional olefin and acid from the raffinate may be partially achieved by charging a portion of the raffinate from the extractor into a multi stage countercurrent absorption system, preferably near the final stage, where olefin reacts with alkyl acid sulfate from the raffinate. The acid phase from the absorption is extrated as usual.

EXAMPLE

In the following example, the feed stocks shown in Table I are employed in the apparatus of the figure.

TABLE I

|  | Liquid volume percent | |
|---|---|---|
|  | Isobutylene feed stock | Butylene feed stock |
| Propylene | 6.6 | 0.1 |
| Propane | 4.0 | 2.7 |
| Isobutane | 24.5 | 34.6 |
| Isobutylene | 17.0 | 15.9 |
| n-Butylenes | 33.4 | 32.4 |
| n-Butane | 14.5 | 11.0 |
| Pentanes | 0.0 | 3.3 |
| Total | 100.0 | 100.0 |

Isobutylene feed stock in an amount of 1236 barrels per day is charged in vapor form to the absorber 11 containing 65 to 70 percent sulfuric acid at 75° F. and 15 pounds per square inch gauge. The acid phase from absorber 11 containing substantially all of the isobutylene is passed to a stripper in which 87 percent of the isobutylene is stripped out of the acid in the liquid phase at 145° F. with 11 mols of isobutane for each mol of isobutylene. The isobutane is obtained from an alkylation deisobutanizer. The isobutane phase from the stripper comprising isobutlyene and isobutyl acid sulfate is passed to alkylation zone 37. The stripped acid phase from the stripper is cooled and recycled to the weak acid absorber. Sulfuric acid alkylation catalyst with a titratable acidity of 90 percent is also charged to weak acid absorber 11 in an amount sufficient to maintain the sulfuric acid content of the acid in the absorber at 65 to 70 percent. The acid tends to become weaker because of water dilution from water in the hydrocarbon feed stocks, and also because of loss of acid in the form of isobutyl acid sulfate in the stripper.

The gaseous effluent amounting to 1026 barrels per day from weak acid absorber 11 substantially free of isobutylene and containing essentially all of the propylene and n-butylenes charged to the weak acid absorber is condensed and passed to absorber 22 operated in liquid phase at 30° F. and 50 pounds per square inch gauge. Used alkylation catalyst of 90 percent titratable acidity at a rate of 101,145 pounds per day is also charged to absorber 22. Separated acid phase comprising dialkyl sulfates is passed to a countercurrent extractor operated at 50° F. and 75 pounds per square inch gauge. Nine mols of isobutane per mol of dialkyl sulfate are also charged to the countercurrent extractor.

Separated extract phase comprising isobutane and dialkyl sulfates is passed to alkylation zone 37. Raffinate phase comprising alkylation contaminants of acid-polymeric oil complex and water, and alkyl sulfates, is discharged as spent acid.

In addition to the isobutylene from absorber 11, and dialkyl sulfates from extractor 34, 4200 barrels per day of butylene feed stock are charged to alkylation zone 37. Isobutane feed and 9596 pounds per day of 99.0 percent white sulfuric acid are also charged to alkylation zone 37.

The 9596 pounds of 99.0 percent acid amounts to 0.05 pounds per gallon of alkylate. The production of alkylate is 4521 barrels per day, with 321 barrels being produced from isobutylene in isobutylene feed stock charged to weak acid absorber 11, 756 barrels being produced from propylene and n-butylenes charged to alkylation catalyst absorber 22, and 3444 barrels being produced from butylene feed charged directly to alkylation. The debutanized alkylate product has a research octane of 96.7 clear and 108.2 with 3.0 cc. of TEL, and a motor octane of 94.0 clear and 107.5 with 3 cc. of TEL.

In the simplest application of the invention when operated directly in combination with an alkylation unit the used alkylation acid is charged to the absorber for reaction with olefin, and dialkyl sulfate product is charged to alkylation. However, there are many different specific ways in which the invention may be used, for example, because of existing conditions or because of charge stocks, especially when used in combination with alkylation when more than one alkylation unit or reactor is operated, as exemplified by but not limited to the following with two alkylation units, A and B and recovery unit R:

(1) Used acid from A and B is charged to R and recovered acid from R is charged only to B.

(2) Used acid from A is charged to R and used acid from B is charged to A, and recovered acid from R is charged to B.

(3) Used acid from A is charged to B and used acid from B is charged to R, and recovered acid from R is charged to A.

(4) Used acid from A and B is charged to R, and recovered acid from R is charged to A and B.

(5) When applied to two alkylation reactors A and B (rather than to two alkylation units A and B) operated in series on acid with a single settler for both reactors, used acid from A is charged to B, used acid from B is charged to R, and recovered acid from R is charged to A. In principle this is the same as (2) above. It is the same principle also as in a multi-reaction zone reactor such as in a cascade reactor with series flow of hydrocarbon and emulsion with only a final settler, or in a multiple reactor unit with parallel flow of hydrocarbon and emulsion with a settler for each reactor or pair of reactors.

In any of the above general modifications a part of the acid sent to recovery R may be from another source, including non-alkylation sources, and not from sources A and B.

Obviously, many modifications and variations of the invention as hereinabove set forth, may be made without departing from the spirit and scope thereof, and therefore, only such limitations should be imposed as are indicated in the appended claims.

I claim:

1. In a process wherein an isoparaffin is alkylated with an olefin in the presence of a sulfuric acid alkylation catalyst in an alkylation reaction zone containing a reaction mixture maintained in liquid phase comprising a hydrocarbon and acid emulsion of reactants wherein said catalyst becomes contaminated with alkylation contaminants, and emulsion effluent comprising a part of said reaction mixture is withdrawn from said reaction zone, and at least a portion of said emulsion effluent is separated into an acid phase containing alkylation contaminants and a hydrocarbon phase, the improvement which comprises:

reacting an olefin feed including tertiary and secondary olefins in a tertiary olefin absorption zone with relatively weak sulfuric acid having a concentration of about 50–70 weight percent $H_2SO_4$ and containing about 30–50 weight percent of water at a temperature of about 50–1000° F. resulting in the selective absorption of tertiary olefin forming an absorption reaction mixture, separating said absorption reaction mixture into a tertiary olefin absorption effluent hydrocarbon phase including said secondary olefin and a tertiary olefin absorption effluent acid phase comprising absorbed tertiary olefin, stripping said tertiary olefin absorption effluent acid phase with isobutane thereby effecting removal of said tertiary olefin and formation of an isobutane-tertiary olefin effluent and a stripped acid phase, and passing said isobutane-tertiary olefin effluent to said alkylation zone.

2. The process of claim 1 wherein said stripped acid phase is recycled to said tertiary olefin absorption zone.

3. The process of claim 1 wherein said olefin feed contacted in said tertiary olefin absorption zone comprises isobutylene.

4. The process of claim 1 wherein said olefin feed contacted in said tertiary olefin absorption zone comprises tertiary amylenes.

5. The process of claim 1 in which said stripping of said tertiary olefin absorption effluent acid phase with isobutane is carried out above 70° F. and at a higher temperature than used in said tertiary olefin absorption zone.

6. The process of claim 5 in which said stripping with isobutane is at a temperature of about 100 to 200° F.

7. The process of claim 1 in which at least a portion of said tertiary olefin absorption effluent hydrocarbon phase including secondary olefin is contacted in a second olefin absorption zone with said separated sulfuric acid alkylation catalyst phase thereby effecting formation of a secondary olefin absorption effluent hydrocarbon phase and a secondary olefin absorption acid phase comprising alkyl sulfates.

8. The process of claim 7 in which a secondary olefin absorption effluent hydrocarbon phase and a secondary olefin absorption effluent acid phase are withdrawn from said secondary olefin absorption zone, separating alkyl sulfates from said secondary olefin absorption effluent acid phase, and passing thus separated alkyl sulfates to said alkylation zone.

9. The process of claim 8 in which said alkyl sulfates from said secondary olefin absorption effluent acid phase are separated by extraction with isobutane.

10. The process of claim 8 wherein said secondary olefin absorption effluent hydrocarbon phase is passed to said alkylation zone.

11. The process of claim 8 wherein at least a portion of said secondary olefin absorption acid phase after separation of alkyl sulfates is passed to said tertiary olefin absorption zone.

References Cited

UNITED STATES PATENTS

| | | | |
|---|---|---|---|
| 2,300,818 | 11/1942 | Sweeney et al. | 260—683.61 |
| 2,355,460 | 8/1944 | Morrell | 260—683.61 |
| 3,234,301 | 2/1966 | Goldsby | 260—683.62 |
| 3,422,164 | 1/1969 | Goldsby | 260—683.61 |

DELBERT E. GANTZ, Primary Examiner

G. J. CRASANAKIS, Assistant Examiner

PO-1050
(5/69)

UNITED STATES PATENT OFFICE
CERTIFICATE OF CORRECTION

Patent No. 3,502,742          Dated March 24, 1970

Inventor(s) Arthur R. Goldsby

It is certified that error appears in the above-identified patent and that said Letters Patent are hereby corrected as shown below:

COLUMN 1, line 4, cancel "Chappaque, N.Y." COLUMN 1, line 5, cancel "(135 E. 42nd St., New York, N.Y. 10017)" and insert on lines 4 and 5 -- Chappaqua, N.Y., assignor to Texaco Development Corporation, New York, N.Y., a corporation of Delaware --. COLUMN 4, line 71, "god" should be -- good --. COLUMN 6, line 22 "temperature about" should be -- temperature of about --. COLUMN 6, line 27, "stem" should be -- step --. COLUMN 6, line 29, "description" should be -- desorption --, and "used" should be -- required --. COLUMN 6, line 67 "need" should be -- needed --. COLUMN 7, line 53, "temperature" should be -- temperatures --. COLUMN 7, line 57, "reffinate" should be -- raffinate --. COLUMN 9, line 20, "realtive" should be -- relative --. COLUMN 9, line 26, "or" should be -- of --. COLUMN 9, line 41, "will not" should be -- will --. COLUMN 11, line 18, "of 0.67" should read -- or 0.67 --; line 69, "isobutlyene" should be -- isobutylene --. COLUMN 13, line 26, "1000°F." should be -- 100°F. --.

SIGNED AND
SEALED
NOV 3 1970

(SEAL)
Attest:

Edward M. Fletcher, Jr.
Attesting Officer

WILLIAM E. SCHUYLER, JR.
Commissioner of Patents